United States Patent [19]

Hughes, Jr.

[11] Patent Number: 4,459,881
[45] Date of Patent: Jul. 17, 1984

[54] CABLE CORING AND STRIPPING TOOL AND METHOD

[76] Inventor: Benjamin W. Hughes, Jr., 75 Old Boston Post Rd., Old Saybrook, Conn. 06475

[21] Appl. No.: 299,730

[22] Filed: Sep. 8, 1981

[51] Int. Cl.³ .............................................. H02G 1/12
[52] U.S. Cl. .................... 81/9.5 C; 30/90.1; 29/566.4; 408/230; 408/206
[58] Field of Search .............. 81/9.5 R, 9.5 A, 9.5 C; 30/103, 92–95, 90.1–90.3, 90.6, 90.7; 408/204–206, 203.5, 230, 207, 210; 29/566.4

[56] References Cited

U.S. PATENT DOCUMENTS

| 5036 | 3/1847 | Newton et al. | 408/230 X |
| 3,749,189 | 7/1973 | Boehm | 408/230 X |
| 3,824,026 | 7/1974 | Gaskins | 408/230 X |
| 4,345,375 | 8/1982 | Hayward | 81/9.5 C |
| 4,379,665 | 4/1983 | Hendershot et al. | 81/9.5 C |

FOREIGN PATENT DOCUMENTS

| 567560 | 8/1977 | U.S.S.R. | 408/230 |

*Primary Examiner*—Frederick R. Schmidt
*Assistant Examiner*—Debra S. Meislin
*Attorney, Agent, or Firm*—McCormick, Paulding & Huber

[57] ABSTRACT

A tool for stripping and coring a coaxial cable includes a cutter holder, an axially elongated cutter mounted on the holder and projecting outwardly from it, and a guide member supported on the cutter holder outwardly of and in coaxial alignment with the outer end of the cutter for cooperating with the cutter to support the tool on and in coaxial alignment with the end portion of an associated cable. The cutter has a coring portion at its outer end which includes at least one cutting edge for cutting away the end portion of the cable core. A stripping portion spaced axially inwardly of the coring portion has a cutting edge for cutting away the outer sheath on the cable. A handle portion is provided for manually rotating the tool relative to an associated cable and is removable to expose a shank of the cutter for chucking in a rotary power tool.

13 Claims, 11 Drawing Figures

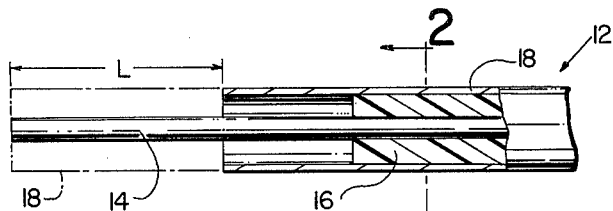
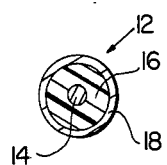
FIG. 1   FIG. 2
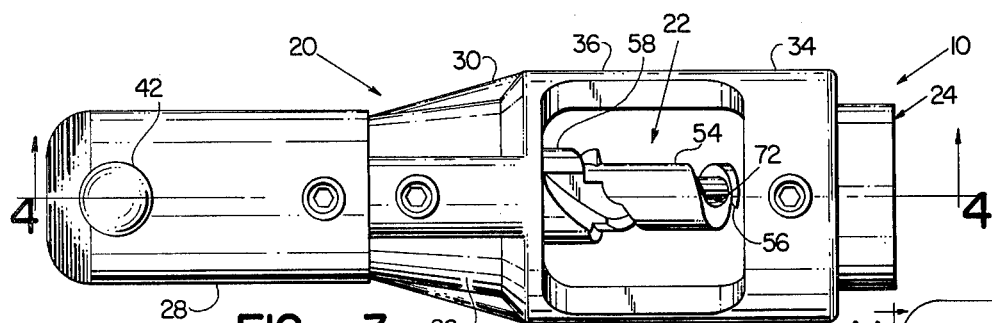
FIG. 3
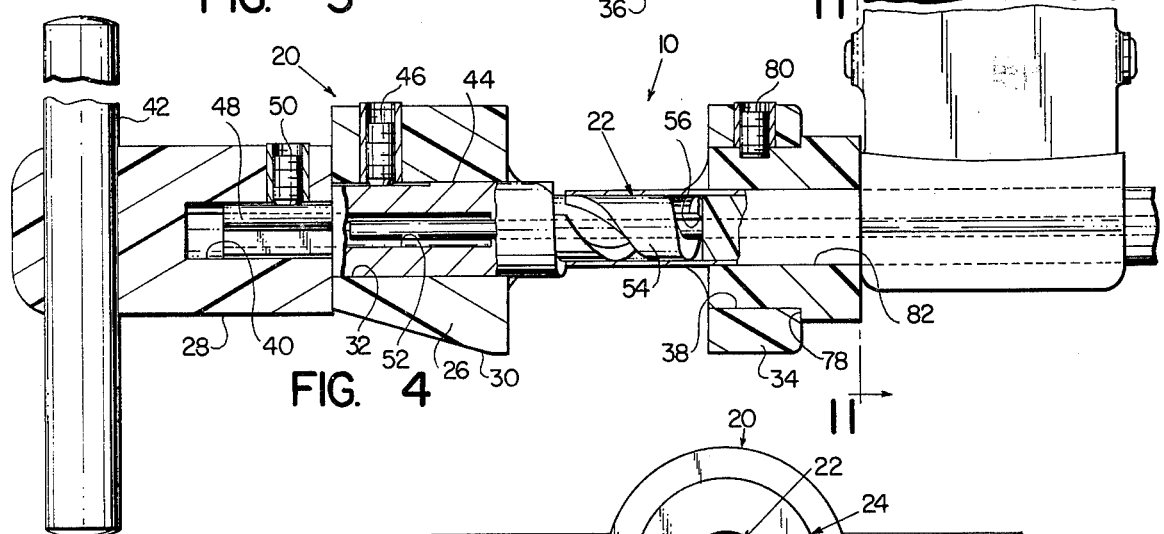
FIG. 4
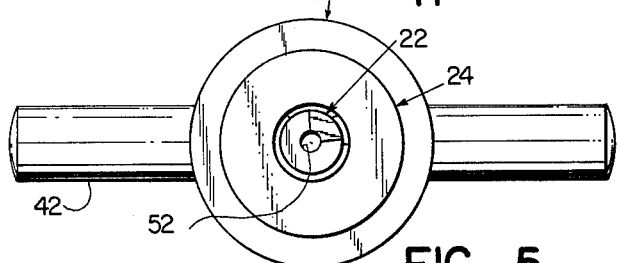
FIG. 5
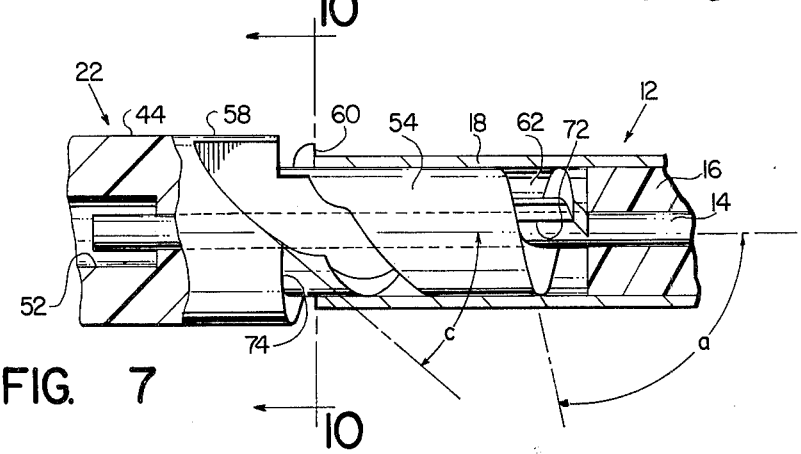
FIG. 7

CABLE CORING AND STRIPPING TOOL AND METHOD

BACKGROUND OF THE INVENTION

This invention relates in general to tools and methods for preparing the end of a cable for termination and deals more particularly with an improved hand tool and method for coring and stripping an end portion of a coaxial cable. The tool of the present invention is particularly adapted for removing a portion of a dielectric core and an outer sheath or jacket of a coaxial cable to expose a length of a central conductor both within and beyond an end portion of the sheath, whereby to enable termination of the cable to establish electrical connection with the conductor and electrical contact with the inner surface of the sheath.

Heretofore various tools have been provided for stripping a portion of the outer sheath and for removing a portion of the dielectric core from such a cable. The general aim of the present invention is to provide an improved hand tool of simple, durable construction for stripping and coring a coaxial cable in a single operation and which may be manufactured at relatively low cost.

SUMMARY OF THE INVENTION

In accordance with the present invention an improved tool is provided for stripping and coring a coaxial cable of a type which has an axially extending central conductor, a generally cylindrical dielectric core in coaxially surrounding engagement with the conductor, and a generally cylindrical outer sheath in coaxially surrounding engagement with the core. The tool comprises a cutter holder and an axially elongated cutter mounted on the holder and projecting axially outwardly therefrom. The cutter includes a coaxial bore which opens through its outer end for receiving the conductor therein. The cutter has coring means at its outer end which includes one cutting edge for removing a portion of the core when the tool is rotated in cutting engagement with and relative to an associated cable. The cutter further includes stripping means spaced axially inwardly from the outer end and which includes a further cutting edge for removing a portion of the outer sheath as the cutter is rotated in cutting engagement with the cable. Another cutting edge on the cutter for separating the dielectric core from the conductor extends in axially parallel relation to the bore and is defined by a portion of the bore. Guide means mounted on said tool holder cooperate with the cutter to maintain the tool in coaxial alignment with the cable as the cutter is rotated relative to and in cutting engagement with the cable.

BRIEF DESCRIPTION OF THE DRAWINGS

FIG. 1 is a fragmentary side elevational view of an end portion of a typical coaxial cable shown partially in axial section.

FIG. 2 is a sectional view taken along the line 2—2 of FIG. 1.

FIG. 3 is a side elevational view of a coaxial cable stripping and coring tool embodying the present invention.

FIG. 4 is a sectional view taken along the line 4—4 of FIG. 3, and shows the tool in cutting engagement with a cable.

FIG. 5 is a right end elevational view of the tool as it appears oriented in FIG. 3.

FIG. 7 is a somewhat enlarged fragmentary side elevational view of the cutter shown in cutting engagement with a coaxial cable.

DETAILED DESCRIPTION OF PREFERRED EMBODIMENT

Figure 9:
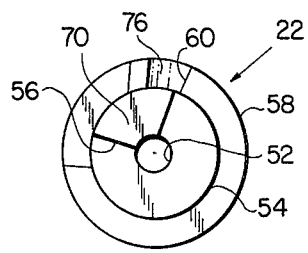
FIG. 9 is a somewhat enlarged right end elevational view of the cutter as oriented in FIG. 7.
Figure 10:
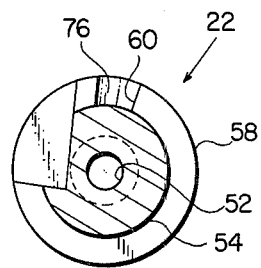
FIG. 10 is a sectional view taken along the line 10—10 of FIG. 7.

Turning now to the drawing, a tool particularly adapted for stripping and coring a coaxial cable and embodying the present invention is indicated generally by the reference numeral 10 in FIGS. 3-5. A typical coaxial cable, particularly suitable for use as a television distribution cable and indicated generally by the numeral 12 in FIGS. 1 and 2, has a generally cylindrical axially extending central conductor 14 engaged by a surrounding generally cylindrical dielectric core 16, which may, for example, comprise a cellular plastic material, such as foam polyethylene, and which may be bonded to the conductor. A generally cylindrical metallic thin wall jacket or outer sheath 18 is engaged with and coaxially surrounds the core.

The tool 10 is particularly adapted to cut away an end portion of the sheath 18, indicated in broken lines in FIG. 1, to expose a portion of the central conductor 14 beyond the end of the sheath 18 and to remove a portion of the dielectric core 16 from within the end portion of the sheath, as shown in FIG. 1, whereby to prepare the cable 12 for termination. The exposed portion of the conductor 14 may be of a predetermined length L, as shown in FIG. 1 and as will be hereinafter further discussed.

Referring now particularly to FIGS. 2-7, the tool generally comprises a cutter holder, indicated generally at 20, and an axially elongated cutter, designated generally by the numeral 22, which is mounted on the cutter holder 20 and projects axially outwardly from it. The tool 10 further includes a guide member, indicated generally at 24, which is supported on the cutter holder 20. The guide member is adapted to engage an associated portion of a cable, such as the cable 12, and cooperate with the cutter 22 to maintain the tool 10 in coaxial alignment with the cable as the cutter operates on the cable, as will be hereinafter more fully described.

The cutter holder may be made from various materials and may take various forms, however, the illustrated cutter holder 20 is preferably made from durable high impact plastic material and includes a body part 26 and a separate handle part 28. The body part 26 has a generally frustoconical inner end portion 30 which has a bore 32 extending coaxially through it, as shown in FIG. 4. The body part 26 further includes a generally cylindrical outer end portion 34 integrally connected to the inner end portion by diametrically opposed side members 36, 36, best shown in FIG. 3. The outer end portion 34 has a bore 38 which is coaxially aligned with the bore 32, but which is of a somewhat larger diameter.

The handle part 28 is preferably generally cylindrical and is also preferably formed from durable high impact plastic material. It has an a coaxial blind bore 40 which opens through its outer end, as best shown in FIG. 4. A metal handle bar 42 press fitted within the handle part 28 extends transversely of the tool axis, as shown in FIGS. 3 and 5.

The cutter 22 comprises an axially elongated generally cylindrical, stepped, hardened steel member which has a central portion 44, the diameter of which is substantially equal to the diameter of the bore 32 in which it is received. A set screw 46 threadably engaged within a threaded sleeve molded in a boss on the frustoconical portion 30 engages a flat on the central portion 44 to releasably retain the cutter 22 in non-rotatable assembly with the body part of the cutter holder 20. An integral shank 48, shown in FIG. 4, which has a diameter somewhat smaller than the diameter of the central portion 44, projects axially inwardly from the central portion and is received within the bore 40 in the handle part 28. A set screw 50 threadably engaged within the handle part 28 engages one of three equiangularly spaced flats on the shank 48 to releasably retain the handle part in nonrotatable assembly with the cutter 22.

A coaxial bore formed in the cutter 22 opens through at least the outer end of the cutter for receiving the conductor 14 therein. The illustrated cutter 22 has a stepped cutter bore 52 which extends throughout the entire length of the cutter and which is diametrically enlarged at its inner end. At its outer end the cutter 22 has a coring part 54 which includes at least one cutting edge 56 for removing a portion of the core 16 from an associated coaxial cable, such as the cable 12, when the cutting tool is axially rotated in cutting engagement with and relative to the cable. The cutter 22 also has a stripping portion 58 which is spaced axially inwardly from its outer end and which includes a further cutting edge 60 for removing a portion of the outer sheath 18 as the cutter is rotated in cutting engagement with and relative to the cable.

Figure 8:
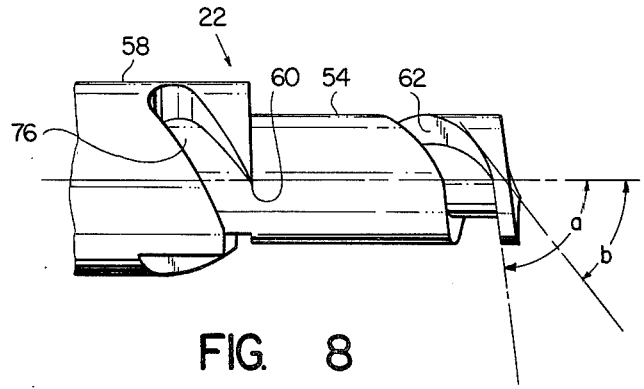
FIG. 8 is a view of the cutter similar to FIG. 7, but shows the cutter after being rotated about its axis approximately 90 degrees in counterclockwise direction from its position of FIG. 7, as viewed in FIG. 5.
Figure 6:
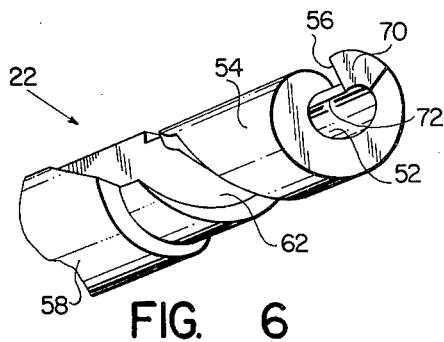
FIG. 6 is a somewhat enlarged fragmentary perspective view of the cutter.

The coring portion 54 is preferably generally cylindrical and has a diameter somewhat smaller than the diameter of the stripping portion 58 which is preferably also of cylindrical form. A spiral flute 62 extends from the outer end portion of the cutter through the coring portion 54 and terminates within the stripping portion 58. The flute 62 has a first portion at its outer end which terminates at the outer end of the cutter at the cutting edge 56. The first portion of the flute extends through an angle of approximately 90 degrees about the axis of the cutter, as viewed looking toward the outer end of the cutter, as it appears in FIG. 9. The first portion of the flute 62 has a first helix angle, indicated by the letter "a" in FIGS. 7 and 8. The helix angle, as shown, is an angle between a line tangent to the flute and another line through the point of tangency and parallel to the axis of the cutter 22.

A second portion of the flute 62 forms a continuation of the first portion of the flute and extends substantially throughout the remaining length of the cylindrical coring portion 54. The helix angle of the second portion of the flute is indicated by the letter "b" in FIG. 8 and is somewhat smaller than the helix angle "a". A third portion of the flute 62 forms a continuation of the second portion and extends from the coring portion 54 into the stripping portion 58. The third portion has a helix angle indicated by the letter "c" in FIG. 7 which is somewhat smaller than the helix angle "b".

The illustrated cutter 22 has a substantially radially disposed surface 70 at its outer end which extends through an angle of approximately 90 degrees. The cutting edge 56 is preferably generally radially disposed and formed by the junction of the radial surface 70 and the flute 62. Preferably, and as shown the coring portion 54 has another cutting edge 72 formed thereon at the junction of the outer end of the flute 62 and the bore 52. The cutter edge 72 extends in a generally axially parallel direction and is preferably angularly spaced about the axis of the cutter from the cutting edge 56, as best shown in FIG. 7.

The stripping part 58 has a generally radially disposed and outwardly facing helical surface 74. The stripping portion 58 further includes a spiral flute 76 which terminates at its outer end at a junction with the helical surface 74 to define the cutting edge 60 which is preferably disposed within a generally radial plane and which preferably extends in a generally radial direction.

The guide member 24 may take various forms but preferably, and as shown, it is made from wear resistant plastic material and comprises a generally cylindrical element which has a cylindrical inner end portion the diameter of which is substantially equal to the diameter of the bore 38 in which it is received. The outer end portion is also generally cylindrical but of somewhat larger diameter. A radially disposed and inwardly facing annular bearing surface 78 is formed on the outer end portion and bears against the outer end of the cutter holder 20 when the guide member 24 is assembled within the bore 38, as best shown in FIG. 4. A set screw 80 threadably engaged within the cutter holder 20 releasably retains the guide member 24 in assembly with the cutter holder, as best shown in FIG. 2. The guide member 24 has a bore 82 which extends through it in coaxial alignment with the cutter 22 and which has a diameter substantially equal to the outside diameter of the coaxial cable sheath 18.

Considering now the operation of the tool 10, a coaxial cable to be prepared, such as the cable 12, usually has an end cut so that the central conductor 14, the end of the core 16 and the end face of the sheath 18 are generally within a common plane. The end portion of the cable 12 is inserted into the guide member 24 through the bore 82 which generally coaxially aligns the end of the cable with the outer end of the cutter 22. The outer end of the cutter is then brought into face-to-face relation with the exposed end of the core 16, after which the tool 10 is manually rotated in clockwise direction, as viewed in FIG. 5, while light pressure is applied to the tool in the direction of the cable to cause the cutting edge 56 to engage and cut the core material 16. The cutting edge 72 also engages and cuts the core material to separate it from the connector 14 to which it is or may be bonded. As the core material is cut, the coring portion 54 advances into the sheath 18. The material cut from the core travels along the flute 62 as the cutter 22 advances into the cable sheath 18. During the cutting operation the central conductor 18 moves freely into the bore 52. The helix angle of the first portion of the flute 62, near the outer end of the cutter 22, enables the cutter to cut the core material in response to relatively light applied cutting pressure. The second and third portions of the flute 62, which have progressively smaller helix angles, allow for rapid passage of scrap material from the tool without risk of scrap jamming the tool.

When the cutting edge 60 engages the end of the sheath 18, further manual rotation of the tool 10 in clockwise direction relative to the cable, results in a cutting away of the sheath 18. In FIG. 7 the tool 10 is shown in cutting engagement with a cable 12, however, for clarity of illustration the scrap material produced by the cutting operation is not shown. When a desired length of the conductor 14 has been exposed beyond the end of the sheath 18 the tool 10 is backed out of the cable 12 by reversing the direction of manual rotation relative to the cable.

Figure 11:
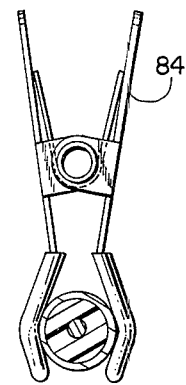
FIG. 11 is a sectional view taken along the line 11—11 of FIG. 4.

If it is desired to expose a predetermined length of the conductor 14 beyond the end of the cable sheath 18, as for example the length L, indicated in FIG. 1, the cable 12 is first inserted into the guide member 24 and brought into face-to-face engagement with the outer end of the cutter 22. A stop, such as a spring clip 84 shown in FIGS. 4 and 11, is next clamped to the cable 12 a distance from the outer face of the member 24 equal to the predetermined conductor length L. The tool 10 is then rotated in cutting engagement with the cable until stop member 24 engages the outer face of the guide member 24. The tool is then backed out of the cable by reversing the direction of tool rotation.

The cutting edge 56 is arranged to cut or face the core material 16 without scoring the inner surface of the cable sheath. The cutting edge 72 is preferably arranged to cut the core material in close proximity to the conductor 14, but without engaging the conductor to avoid the risk of scratching or otherwise damaging it. Since the core 16 may be bonded to the conductor 14, some core material may remain adhered to the conductor after the coring and stripping operation has been completed. This remaining core material may be turned off the conductor 14 by applying a torch or the like to the exposed end of the conductor. The conductor may then be cleaned with a suitable solvent or the like.

As previously described, the tool 10 may be manually operated to prepare the end of a coaxial cable 12 for termination. However, the tool 10 may also be driven by a rotary power tool. If it is desired to use the tool in the latter manner, the set screw 50 is loosened and the handle portion 28 removed from the tool to expose the shank 48. The shank 48 may then be secured in the chuck of a relatively low speed rotary power tool. The speed at which the tool is operated will, of course, depend upon the characteristics of the material from which the cable is made.

I claim:

1. A coaxial cable stripping and coring tool for use with a cable having an axially extending cylindrical conductor, a generally cylindrical dielectric core in coaxially surrounding engagement with the conductor, and a generally cylindrical outer sheath in coaxially surrounding engagement with the core, said stripping and coring tool comprising a cutter holder, a cutter mounted in said cutter holder and projecting axially outwardly therefrom, said cutter having a coaxial bore opening through its outer end for receiving the conductor, said bore having a diameter substantially equal to the diameter of the conductor, said cutter having coring means at its outer end including one cutting edge for cutting away a portion of the core when said cutting tool is axially rotated in cutting engagement with and relative to the cable, said cutter having stripping means spaced axially inwardly from said outer end and including a further cutting edge means for cutting away a portion of the outer sheath as said cutter is rotated in cutting engagement with and relative to the cable, another cutting edge means for cutting the dielectric core to separate it from the conductor and including another cutting edge extending in axially parallel relation to said bore and defined by a portion of a wall defining said bore, and guide means mounted on said cutter holder and cooperating with the cable for maintaining said tool in generally coaxial alignment with the cable.

2. A coaxial cable stripping and coring tool as set forth in claim 1 wherein said cutter comprises a stepped generally cylindrical member having stripping and coring portions respectively defining said stripping and coring means and said stripping portion has a diameter greater than the diameter of said coring portion.

3. A coaxial cable stripping and coring tool as set forth in claim 2 wherein said cylindrical coring portion has a spiral flute opening through one end thereof and including a first portion having a first helix angle and a second portion having a second helix angle smaller than said first helix angle.

4. A coaxial cable stripping and coring tool as set forth in claim 3 wherein said flute extends into said stripping portion and includes a third portion having a third helix angle smaller than said second helix angle.

5. A coaxial cable stripping and coring tool as set forth in any one of claims 1 through 4 wherein said one cutting edge extends in a generally radial direction and said further cutting edge means extends in a generally radial direction.

6. A coaxial cable stripping and coring tool as set forth in claim 5 wherein said one cutting edge is defined by the intersection of said spiral flute and the outer end surface of said cutter and said other cutting edge is defined by the intersection of said spiral flute and a wall defining said coaxial bore.

7. A coaxial cable stripping and coring tool as set forth in claim 6 wherein said cutting edge is angularly displaced about the axis of said cutter from said one cutting edge.

8. A coaxial cable stripping and coring tool as set forth in claim 5 wherein said one cutting edge is disposed in a generally radial plane.

9. A coaxial cable stripping and coring tool as set forth in any one of claims 1 through 4 wherein said further cutting edge comprises a generally radially disposed cutting edge extending radially outwardly beyond said one cutting edge.

10. A coaxial cable stripping and coring tool as set forth in claim 4 wherein said further cutting edge means is defined by the intersection of the third portion of said flute and an outer end part of said stripping means.

11. A coaxial cable stripping and coring tool as set forth in claim 10 wherein said further cutting edge is disposed generally within a radial plane.

12. A coaxial cable stripping and coring tool as set forth in claim 11 wherein said further cutting edge extends in a generally radial direction.

13. A coaxial cable stripping and coring tool as set forth in any one of claims 1 through 4 wherein said cutter holder has an inner end portion and an outer end portion axially spaced from said inner end portion and integrally connected thereto by diametrically opposed side members, said outer end portion having a coaxial outer end bore, said guide means comprising a guide member releasably secured within said outer end bore and including a coaxial guide bore therethrough having a diameter substantially equal to the diameter of the cable outer sheath.

* * * * *